UNITED STATES PATENT OFFICE.

HERMANN W. VOGEL, OF BERLIN, GERMANY.

PROCESS OF PRODUCING PHOTOGRAPHIC EMULSIONS.

SPECIFICATION forming part of Letters Patent No. 235,831, dated December 21, 1880.

Application filed June 15, 1880. (No specimens.)

*To all whom it may concern:*

Be it known that I, HERMANN W. VOGEL, professor and doctor, of the city of Berlin, in the Kingdom of Prussia and German Empire, have invented certain new and useful Improvements in the Preparation or Production of Photographic Emulsions, of which the following is a specification.

The gelatine dry plates hitherto in use are extremely sensitive, and are produced by pouring an emulsion consisting of an aqueous solution of gelatine containing bromide of silver over the plates and allowing the same to dry. This aqueous bromide-of-silver gelatine emulsion possesses the disadvantage that it decomposes very rapidly, dries very slowly when distributed over the plate, intensifies and washes with difficulty, and easily frills on the plate. After many experiments I have succeeded in overcoming these disadvantages by an entirely new process hitherto unknown in photography, for which purpose I use gelatine containing bromide of silver (or chloride of silver and iodide of silver, or a mixture of the same) in combination with pyroxyline.

No means of combining gelatine or gelatine emulsion with a solution of pyroxyline—*i. e.*, collodion—so as to form a homogeneous fluid has been known up to the present time. If common collodion is added to an ordinary gelatine emulsion, the dissolved matters will be precipitated in flakes.

I have now succeeded in obtaining a perfect homogeneous mixture by using a solvent which will dissolve both substances, bromide-of-silver gelatine and pyroxyline. Such solvents are the various organic acids—namely, the inferior members of the fatty acids, such as formic acid, acetic acid, propionic acid, &c., and their derivatives, or mixtures of the same, alone or with methylated spirit ethyl, alcohol, &c. I found that gelatine bromide of silver dissolved in these solvents without precipitating the salts of silver contained in the same, and that, contrary to all previous experience, the photographic properties of these salts were not essentially changed by the presence of the acids; that the properties of the gelatine emulsion in the solution were improved, so that it no longer possessed the disadvantages of the aqueous emulsion, as mentioned above, and that its properties are still further improved by the combination with pyroxyline.

To produce the combination aforenamed I use the following four various methods:

I. I first produce a gelatine emulsion according to the customary process, which is then dried by means of cold or warm air or other means for extracting the water. This dry bromide-of-silver gelatine (which can also contain iodide of silver and chloride of silver) I then dissolve, warm, in one of the above-mentioned acids, using three to ten times as much, or even more, acid. The quantity of acid to be used depends on the solvency of the gelatine, and must be tried for each kind. This acidulous emulsion is now used alone after having been diluted with alcohol to the required consistency, or can be mixed with pyroxyline. The pyroxyline is dissolved in acetic acid, a like acid, or a mixture of such acid with alcohol. The most appropriate quantity of pyroxyline is about one per cent. of the quantity of acidulous emulsion employed. Instead of this process the following method can be used:

II. Pyroxyline is dissolved in one of the fatty acids—for instance, formic acid or acetic acid, or a mixture of such acids *per se*, or with alcohol or other solvent which will dissolve both gelatine and pyroxyline. The proportions can be varied in many different ways, so that the following formula serves simply as an example—*id est:* two grams pyroxyline, fifty grams acetic acid; fifty grams alcohol. The collodion produced by this process is mixed with about an equal quantity of acidulous emulsion, as above described. The gelatine emulsion collodion produced can be slightly warmed and applied, like ordinary collodion, to glass plates, paper, &c., and exposed to the light either in a moist or dry condition. A similar mixture can be prepared as follows:

III. A collodion emulsion is prepared according to the customary formula and precipitated as usual by water, or the emulsion is allowed to dry up, then washed and the dry matter dissolved in one of the above-mentioned acids or mixtures of the same with alcohol. Gelatine, either alone or after being dissolved in one of the solvents mentioned above, is now added to the collodion preparation. The proportions can be varied in the like degree as in the preparation of the ordinary collodion emulsion. The following is, for instance, one of the various proportions of the mixture: Seven grams of the precipitated pyroxyline containing bromide of silver are dissolved in one hundred and fifty grams alcohol and ninety grams acetic acid; then two grams gelatine are dissolved in twenty grams acetic acid and added to the same. Another process for producing a similar mixture is:

IV. Dissolve gelatine and pyroxyline in one of the above-mentioned solvents, or dissolve them separately and then mix the solutions. Finely-powdered bromide of silver, prepared in the customary manner, or any one of the silver haloid salts, or a mixture of the same, is now added to the gelatine-collodion solution, or the silver haloid salts are produced in the gelatine-collodion solution through double decomposition.

These proportions can also be varied in different ways.

Having now described my said invention and the manner of carrying the same into effect, what I claim, and desire to secure by Letters Patent, is—

1. The process of producing and obtaining a homogeneous mixture of gelatine containing bromide of silver, or its equivalent, and pyroxyline by means of a solvent capable of dissolving both substances, substantially as described.

2. The process of forming a homogeneous mixture containing bromide of silver, or its equivalent, with pyroxyline, which consists in first producing the gelatine emulsion in the customary way and drying the same, then dissolving it in an organic acid and mixing the solution with pyroxyline, also dissolved in an organic acid, as set forth.

3. An improved homogeneous photographic emulsion, consisting of gelatine containing bromide of silver, or its equivalent, in combination with pyroxyline and an organic acid, as set forth.

In testimony whereof I have signed my name to this specification in the presence of two subscribing witnesses.

PROFESSOR DR. HERMANN W. VOGEL.

Witnesses:
EDWIN A. BRYDGES,
GUSTAV EHLEN.